July 18, 1939.  W. R. POSTLEWAITE  2,166,608
PIPE FEEDING AND COUPLING DEVICE
Filed June 14, 1937    3 Sheets-Sheet 1
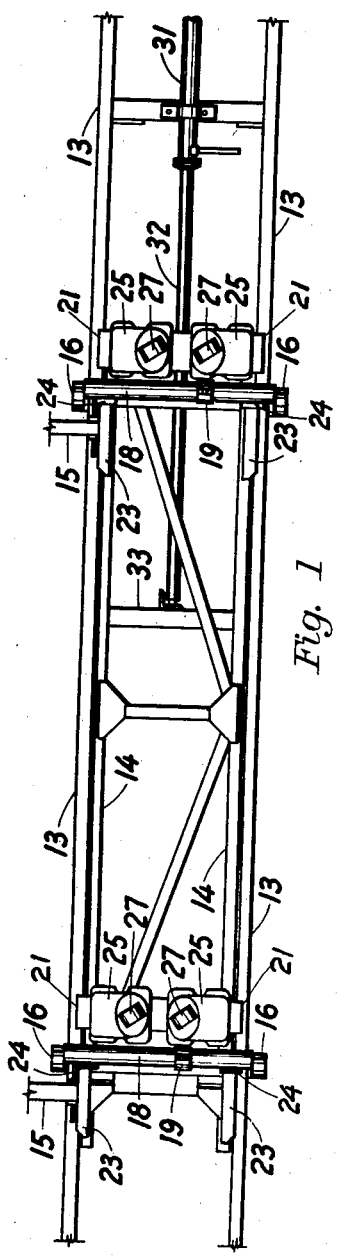
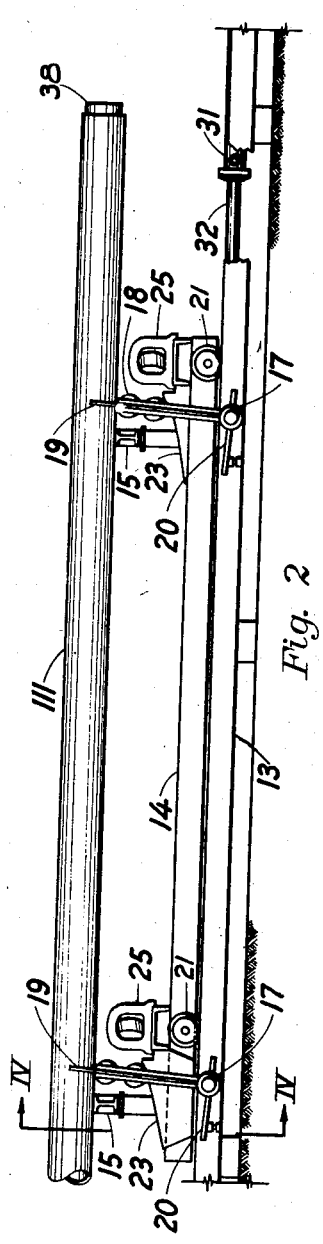
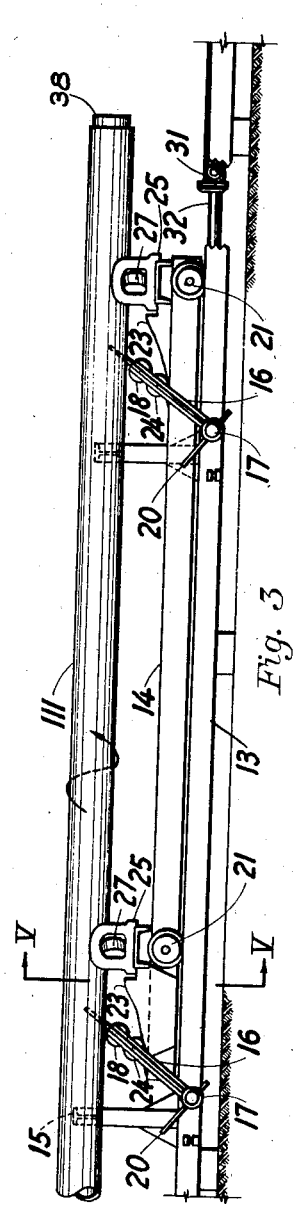
Inventor
WILLIAM R. POSTLEWAITE
by *J. R. Adams*
Attorney

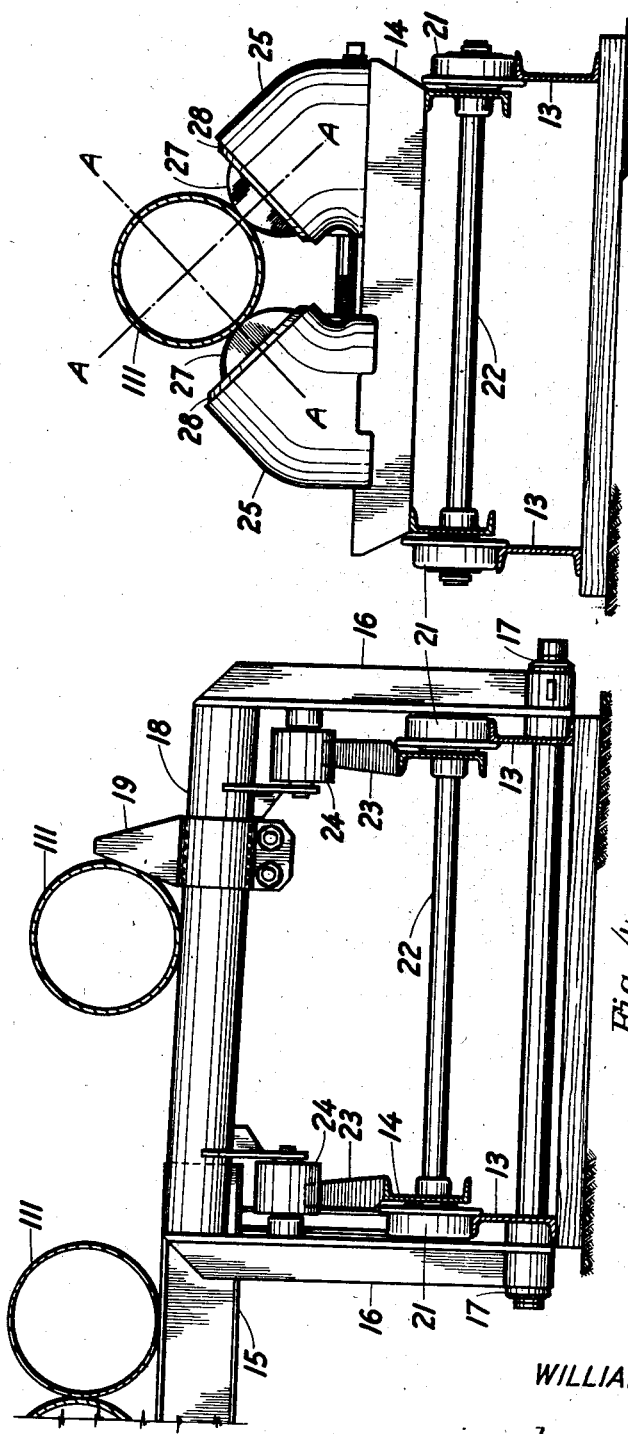

July 18, 1939.  W. R. POSTLEWAITE  2,166,608
PIPE FEEDING AND COUPLING DEVICE
Filed June 14, 1937   3 Sheets-Sheet 3
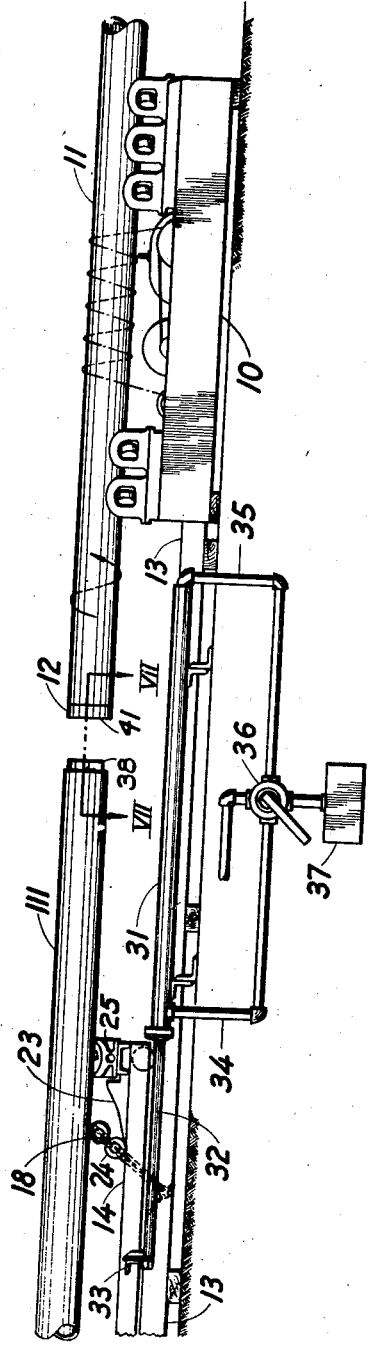
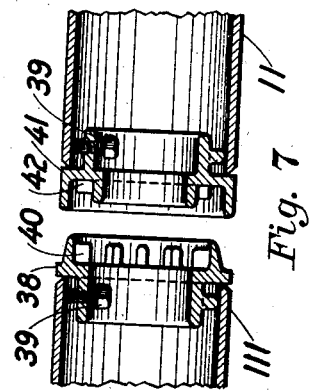
Inventor
WILLIAM R. POSTLEWAITE
by *J. R. Adams*
Attorney Patented July 18, 1939

2,166,608

UNITED STATES PATENT OFFICE 2,166,608

PIPE FEEDING AND COUPLING DEVICE

William R. Postlewaite, San Francisco, Calif., assignor to Standard Oil Company of California, San Francisco, Calif., a corporation of Delaware Application June 14, 1937, Serial No. 148,245

7 Claims. (Cl. 214—1)

This invention relates to the art of handling and feeding pipe or other cylindrical objects and particularly refers to means for temporarily coupling together and feeding a succession of lengths of pipe which are to be passed through a continuously operating helical feed coating machine adapted to apply a layer or wrapping of corrosion-resistant material to the outer surface of the pipe. The invention is an improvement over a similar pipe feeding and coupling apparatus described and claimed in the copending patent application assigned to the common assignee herewith, filed June 14, 1937, by Joseph F. Putnam, as Serial No. 148,246.

Certain continuous pipe coating operations require that a helical feed, i. e. a combined rotating and longitudinal motion, be given to the pipe, so that any given point on its outer surface describes a helix, in order that a coating of paint, or a plastic layer of corrosion resistant material, or a flexible tape adapted to prevent corrosion, may be continuously applied. Another requirement is that successive lengths of pipe be securely aligned and abutted or coupled together during their passage through the device which gives them such a helical motion, and thence through the coating equipment, after which the lengths must be quickly and easily uncoupled or separated, so that they may be stacked or stored for use.

It will be appreciated that, as any one length of pipe advances into, through and out of the helical feed device, the requirements imposed upon the means coupling it to the preceding and to the succeeding lengths of pipe are severe. As the pipe length or section approaches the helical feed mechanism, which may be of any known type such as that of Patent No. 2,112,865, the pipe must be securely coupled to and aligned with the length already in the mechanism so that it will follow the said length. Assuming a counter-clockwise direction of rotation of the pipe, the leading part of the coupling, which is secured to the pipe already in the machine, must transmit a counter-clockwise torque to the trailing part of the coupling which is secured to the following pipe length. In order to prevent separation of the two parts of the coupling and the two pipes, a longitudinal force in the direction of motion must be imparted to the trailing section of the coupling or to the pipe in which it is secured by some means acting either upon the coupling or upon the following pipe section.

After the coupling joining the two pipes passes through the helical feed mechanism the relative direction of torque between the two halves or parts of the coupling is reversed from that just described. The trailing part of the coupling must now transmit counter-clockwise torque to the leading part, and due to the usual requirement that the lengths of pipe be kept in closely abutting contact until they have passed through the coating operation, which ordinarily follows the imparting of the helical motion, it is apparent that the two parts of the coupling must transmit torque in either direction. This automatically precludes any sort of screw thread arrangement, as such would obviously become unscrewed either before or after the coupling passed through the helical feed means, due to the torque reversal just described.

A further requirement for this service is that after the coupling has passed entirely through the helical feed means and the pipe coating means, the two parts of the said coupling must be readily separable without any extensive rotation or manipulation of the freshly coated length of pipe, so that the latter may be removed as for storage.

This invention broadly comprehends a simple coupling for a pipe coating operation of this nature and a means for keeping the two parts thereof, as well as the pipes which they join, in close and operative contact before, during and after passage through a helical feed means which may be followed by a pipe coating means, with the added advantage of providing a ready separation of the coupler parts and the pipe lengths which they have secured together, after the completion of the coating operation. The invention also comprehends a means for transferring a length of pipe from a stationary storage rack onto a car or carriage which may be included in the means outlined above, together with means for lowering the length of pipe onto the carriage without damage to either and at the proper point in the operation of the transferring apparatus.

As a coupler for temporarily securing together successive lengths of pipe as they are fed into the helical feed apparatus, I prefer a coupling of a simple jaw type that is adapted only for torque transmission, without the addition of lugs or hooks on the inter-engaging jaws, or equivalent means to make it adapted also for a transmission of the longitudinal force. Such a coupling is described and claimed in my copending patent application Serial No. 28,094, filed June 24, 1935, which issued April 20, 1937, as Patent No. 2,077,769. Briefly, it comprises two separable clutch sections with lugs adapted to transmit a torque in either direction, together with certain self-aligning features not essential to this invention.

This invention is not, however, limited to a coupling such as that described above but may also be used with that type described in Patent No. 1,948,956 issued February 27, 1934, to D. W. Boylan, in which hooks or lugs are provided so that the coupler will transmit a longitudinal force as well as a torque.

It is an object of this invention to provide a means for transferring a pipe from a stationary storage rack to a longitudinally movable means, such as a carriage which may be advanced to couple the said pipe to a preceding length which is being advanced helically by any form of helical feed machine.

Another object is to provide an improved form of carriage or longitudinally movable means for advancing a length of pipe and coupling it to a preceding length which has been given a helical motion.

Another object is to provide a means for lowering a length of pipe onto feed means carried by a carriage or the like so as to automatically place the said pipe on the said feed means at the proper position in the travel of the carriage.

Another object is to provide a means for advancing and for selectively restraining the motion of a carriage or the like which is being used to advance and couple a length of pipe to a preceding length which is advancing helically.

Another object is to provide a simple jaw clutch type of pipe coupling means which is adapted to cooperate with angularly directed guiding elements on a selectively movable carriage so that a torque transmitted to said coupling will cooperate with the angularity of said elements to provide a controlled helical motion of said pipe.

Another object is to provide a simple pipe transferring and advancing means that will be adapted to freely receive a length or section of pipe, advance the same and couple it to a preceding helically moving section of pipe, and then maintain both of said sections in closely abutting contact until the said first length has been positively engaged by the means which gives it a helical motion.

These and other objects and advantages will be further apparent from the following description and from the accompanying drawings which form a part of this specification and illustrate a preferred embodiment of an apparatus suitable for carrying out this invention.

In the drawings,

Figure 1 is a plan view of a pipe storage rack and a longitudinally moving carriage in position to receive a pipe therefrom.

Figure 2 is a side elevation view of the pipe rack and carriage of Figure 1 and illustrates a pipe on the carriage in position to be lowered to the feed means of the said carriage.

Figure 3 is a vertical elevation view similar to Figure 2, and illustrates the mode of operation of the pipe receiving and lowering means on the carriage.

Figure 4 is a vertical sectional view on line IV—IV of Figure 2, and illustrates in more detail the pipe receiving and lowering mechanism.

Figure 5 is a vertical sectional view on line V—V of Figure 3 and illustrates a preferred form of angularly directed elements adapted to give a helical motion to the pipe which has been lowered onto said elements.

Figure 6 is a vertical elevation view of the right portion of the apparatus shown in Figure 3, and illustrates in more detail the carriage advancing means and a helical feed device into which the pipe is to be advanced.

Figure 7 is a vertical sectional view on line VII—VII of Figure 6 in the plane of the pipe axis, and illustrates a preferred form of jaw type coupler for joining together successive sections or lengths of pipe.

Referring to Figure 6 which could be considered a general assembly view of the apparatus, a helical feed device generally represented by 10 is illustrated as imparting a helical motion to a length of pipe 11 in the trailing end of which is one section 41 of a separable coupler generally designated 12. A track 13 is arranged below and parallel to the axis of pipe 11 and is adapted to receive any suitable form of carriage 14 so that the carriage is movable longitudinally with respect to the axis of pipe 11.

Referring now to Figures 1 and 2, the carriage 14 is illustrated as being substantially in its pipe receiving position. Track 13 is provided with a pair of arms 16 journalled at 17 and provided with cross-members 18 at substantially the level of pipe rack 15 (Figure 4). A stop-member 19 is adjustably secured on each of cross-members 18 to limit the travel of pipe 111 along said cross-members 18. A spring 20 is preferably adjustably secured to the lower ends of arms 16 to limit their motion and to urge them in a clockwise direction on the journals 17.

Carriage 14 is preferably provided with wheels 21 on axles 22 so that the carriage may be longitudinally moved on track 13. Inclined cams 23 on carriage 14 are adapted to engage rollers 24 on arms 16 so that when the carriage 14 is at its extreme left position arms 16 will be carried upwardly to the vertical or pipe receiving position shown in Figure 2.

One or more pairs of brackets 25 are secured to carriage 14 and are provided with rollers 27 and adjustable bearing plates 28, forming inclined guide elements of the general type disclosed in the copending Joseph F. Putnam application Serial No. 148,246, filed concurrently herewith.

The bearing plates 28 which support and align rollers 27 are each mounted in brackets 25 so as to be movable about an axis A—A (Figure 5) which preferably intersects the longitudinal axis of pipe 111 and is at an angle of about 45° below the horizontal. Plates 28 carry freely rotatable resilient faced guide means or skew rollers 27 journalled therein. It will be obvious that the angle at which plates 28 are set at one side of pipe 111 will be opposite hand with respect to the angle to which those plates on the opposite side of pipe 111 are adjusted.

In order to selectively move carriage 14 along track 13 a hydraulic cylinder 31 may be provided between the members of track 13 (Figure 6). A piston rod 32 extends from cylinder 31 and is secured to cross-member 33 on carriage 14. Pipe connections 34 and 35 lead to the respective ends of cylinder 31 and are connected by means of a 4-way cock 36 to a source of hydraulic pressure 37. Suitable manipulation of cock 36 will permit the piston rod 32 of cylinder 31 to be extended or withdrawn therefrom. In the intermediate position of cock 36 the position of rod 32 and carriage 14 may be fixed so that carriage 14 will be locked with respect to track 13.

It will be appreciated that, with piston rod 32 and carriage 14 fixed or locked as just described so as to prevent longitudinal motion of carriage 14 with respect to the helical feed device 10, any rotative force or torque applied to pipe 111 will cause a controlled helical motion of that pipe due to the longitudinal or axial component introduced by the fixed skew or inclined rollers 27 on carriage 14. If the angle of inclination of all the effective rollers 27 is substantially equal to the helix angle of the helical motion imparted to pipe 11 by the helical feed device 10, the same helical motion will be applied to the following pipe section 111.

In order to provide this rotation component or torque, a separable jaw clutch coupler 12 as illustrated in Figure 7 may be used. In this example, the male section 38 of the coupler is adapted to be fitted into and secured to the right or leading end of pipe 111 as by set screw 39, and is provided with a plurality of circumferentially spaced, radially inwardly extending lugs 40. The complementary or female section 41 of the coupler is similarly secured into the trailing end of pipe section 11, as by set screw 39, and is provided with a similar series of circumferentially radially outwardly extending lugs 42. When the two halves of the coupler are engaged by an axial motion, and maintained in contact as by a continuing axially applied force, they will transmit a torque in either direction, due to the interengaging lugs 40 and 42.

Obviously, not all of the brackets 25 need carry rigidly secured rollers 27, as some may be loosely swivelled and serve only to support pipe 111, while others do the actual guiding. In case a coupler is used which will serve to transmit an axial force as well as a torque, such as the one described and claimed in the Boylan Patent No. 1,948,956 cited above, none of rollers 27 need be fixed and bearing plates 28 may be permitted to adjust themselves to the helix angle which will then be maintained by the combination of the torque and axial force components transmitted by the coupler from pipe 11.

As soon as the following length of pipe 111 is actually engaged by the effective means of the helical feed mechanism 10, hydraulic cylinder 31 may be actuated by means of cock 36 to move to the left, thus returning carriage 14 to the position shown in Figures 1 and 2. Just before reaching this position cams 23 on the pipe receiving means 16—18 will engage rollers 24 and lift arms 16 and cross members 18 to their vertical or pipe receiving position. A new length of pipe 111 may then be rolled onto cross-members 18 from pipe rack 15 until the pipe 111 touches the stop-members 19, which serve to center pipe 111 over rollers 27. Cock 36 is then turned to move piston rod 32 and carriage 14 to the right so that the section 111 of pipe on that carriage will be advanced to couple it with the preceding section 11 already engaged by the helical feed means 10.

The first part of the travel of carriage 14 to the right will withdraw cams 23 from beneath rollers 24, thus permitting arms 16 to rotate in a clockwise direction to the position shown in Figure 3, lowering pipe 111 to contact rollers 27. The continuing motion of the carriage 14 to the right under the control of hydraulic cylinder 31 will advance pipe 111 until the two parts 38 and 41 of the coupler will be engaged. At the moment of engagement cock 36 is preferably turned to the intermediate position so that carriage 14 is locked with respect to track 13. The torque imparted to pipe section 111 will then be effective to cooperate with the inclined rollers 27 to give a helical motion to pipe 111. With proper adjustment of rollers 27 this helical motion will advance the pipe at the same rate at which helical feed device 10 is advancing pipe 11 so that the two pipes will be closely abutted and fed forwardly.

Thus it will be apparent that this invention embodies a new and useful means for receiving and lowering a length of pipe upon a second means which is adapted to advance the pipe to couple it with a preceding length which is being helically advanced as in a pipe coating apparatus. Although a specific construction has been described and illustrated, it is obvious that many changes and modifications can be made without departing from the essential features of the invention and all such modifications as are within the scope of the following claims are embraced thereby.

I claim:

1. A pipe feed device for a helical pipe feed machine comprising a storage rack for pipe, a carriage movable with respect to said storage rack and adapted to advance a length of pipe into said helical pipe feed machine, and means for receiving a length of pipe from said storage rack and placing it upon said carriage while said carriage is aligned with said rack, said last named means being actuated by said carriage to place said means in pipe receiving position above said carriage.

2. A pipe feed device according to claim 1, in which said pipe receiving means is movably supported adjacent said rack and said carriage is adapted to lift said means to the level of said rack.

3. A pipe feed device according to claim 1, in which said pipe receiving means is movably supported adjacent said rack and said carriage is provided with a cam member to engage said means to move it to a pipe receiving position and to a pipe releasing position.

4. A pipe feed device according to claim 1, in which said pipe receiving means comprises a pair of hinged members adapted to be lifted to pipe receiving position by said carriage at one part of its travel, and to be lowered by a subsequent movement of said carriage to release a length of pipe onto said carriage.

5. A pipe feed device for a helical pipe feed machine comprising a storage rack for pipe, a carriage movable with respect to said storage rack and adapted to advance a length of pipe into said helical pipe feed machine, and means movably supported adjacent said storage rack for receiving a length of pipe from said storage rack and placing it upon said carriage, said carriage being provided with a cam member to engage said pipe receiving means to move it to a pipe receiving position and a pipe releasing position.

6. A pipe feed device according to claim 5 in which said pipe receiving means comprises a pair of hinged arms extending across said carriage and above the same.

7. A pipe feed device according to claim 5 with the addition of means for moving said carriage and selectively locking it in a fixed position.

WILLIAM R. POSTLEWAITE.